United States Patent Office 3,222,604
Patented Dec. 7, 1965

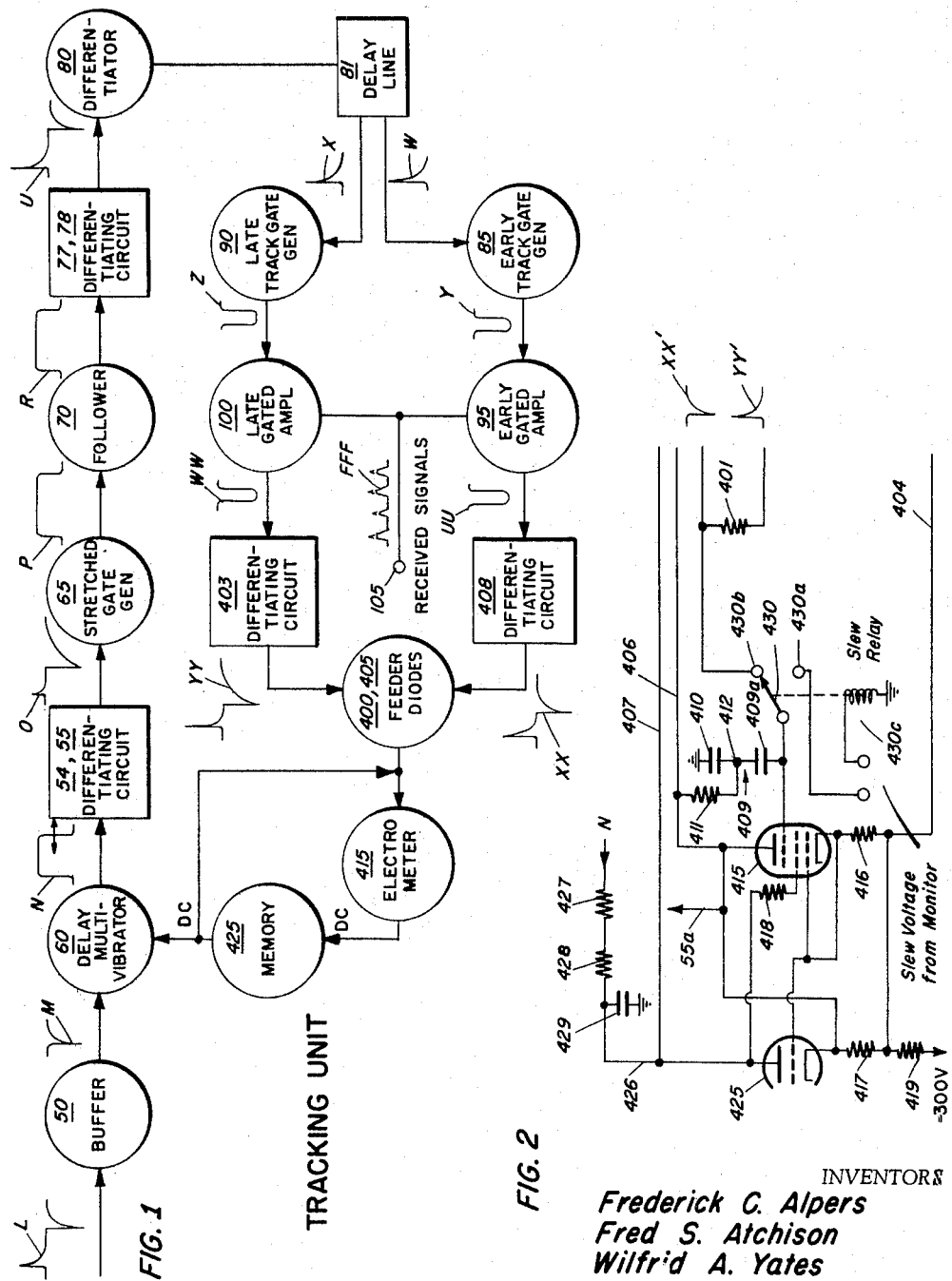

3,222,604
ELECTROMETER AND MEMORY CIRCUIT FOR GUIDED MISSILE CONTROL SYSTEM
Frederick C. Alpers and Fred S. Atchison, Corona, Calif., and Wilfrid A. Yates, Silver Spring, Md., assignors to the United States of America as represented by the Secretary of the Navy
Original application July 1, 1952, Ser. No. 296,772. Divided and this application Nov. 26, 1958, Ser. No. 789,219
4 Claims. (Cl. 328—121)
(Granted under Title 35, U.S. Code (1952), sec. 266)

The invention described herein may be manufactured and used by or for the Government of the United States of America for governmental purposes without the payment of any royalties thereon or therefor.

This application is a division of copending application Serial No. 296,772, filed July 1, 1952 by the present applicants.

An object of the present invention is to provide a control system for a guided missile which provides a memory of target range and rate of change of target range, to enable continual homing of the missile during a momentary loss of the target from the sensing system's field of vision.

Another object of the present invention is to provide a control system for a guided missile which provides a memory of selected target range and rate of change of range to enable continual homing of the missile during a momentary loss of the target from the sensing system's field of vision.

Other objects and advantages of the present invention will become apparent to those skilled in the art from a consideration of the following general and detailed description of one embodiment of the present invention had in conjunction with the accompanying drawings, in which the same indicia refer to the same or corresponding parts or information and wherein:

FIG. 1 is a functional block diagram of a Tracking Unit;

FIG. 2 is a schematic diagram of one part of a Tracking Unit embodying the electrometer and memory circuit.

The basic purpose of the Tracking Unit is to provide a continual measure in terms of time of a selected target's range, and does so, in essence, by continually indicating the time interval between each radar pulse transmission and the reception of the selected target's echo thereof. The differentiated form L of pretrigger pulses are fed to the Tracking Unit through an isolating buffer 50, which passes only the leading portion of wave forms L as pulses M to trigger a monostable delay multivibrator 60. The width of delay multivibrator output pulses N is variable and controlled by the output voltage of an electrometer and memory circuit 415, 425, as will be subsequently explained. As will become apparent after a consideration of the entire Tracking Unit loop, the time phase of the trailing edge of each multivibrator square wave output N with relation to the leading edge of the corresponding pretrigger pulse, as established by the electrometer and memory circuit output, is, when properly interpreted, a measure of and controlled by selected target range. The pulses N are differentiated into wave forms O at 54, 55 and applied to stretched gate generator 65 to produce long duration square wave pulses P, whose leading edges are in time coincidence with the trailing edges of the corresponding multivibrator output pulses N, thus placing each leading edge thereof in the same time phase with relation to each pretrigger pulse as was the trailing edge of the corresponding multivibrator output. Stretched gates P are then coupled through cathode follower 70 as range pulses R to the remainder of the Tracking Unit. Each pulse R in being applied to the remainder of the Tracking Unit is also differentiated at 77, 78 into wave form U, the leading or positive portion thereof being applied through differentiator 80 to delay line 81. The output of differentiator 80 is tapped off from delay line 81 at two points establishing a fixed time interval between early tracking gate trigger pulses W and corresponding late tracking gate trigger pulses X. These triggers are applied respectively to the early tracking gate generator 85 for producing early tracking gates Y, and to the late tracking gate generator 90 to produce the late tracking gates Z.

The time relation of each set of gates Y and Z to reception of the corresponding desired echo pulse from pattern FFF, obtained from the radar receiver at input 105, is obtained by the early gated amplifier 95 and late gated amplifier 100. The powers of pulses UU issuing from amplifier 95 are determined by the degree of time coincidence or overlap between the selected target echo signals and the corresponding early tracking gates Y; and the powers of pulses WW issuing from amplifier 100 are likewise determined by the degree of time coincidence or overlap between the selected target echo signals and the corresponding late tracking gates Z. The powers of pulses UU and pulses WW are compared in the memory and electrometer circuit 425 and 415, being fed thereto as a differential output of the feeder diodes 400, 405. However, to effect this power comparison, for reasons that will subsequently become apparent, the pulses WW are differentiated at 403 into wave forms YY, and the pulses UU are differentiated at 408 into wave forms XX, prior to their application to the feeder diodes. The D.C. output from the combined efforts of the feeder diodes and electrometer and memory circuit is used to control the time constant or output pulse width of the multivibrator 60. The time phase of the trailing edges of pulses N is thereby adjusted during each repetition cycle as required by the electronic comparison of the early and late tracking gate time phases with that of the selected target echo reception, to keep the two gates Y and Z locked on the target echo, hence providing a measure in time of target range.

In explanation of the foregoing, with a condition established that the selected target received signals are sandwiched in time between the corresponding pairs of early and late tracking gates Y and Z, the time phase of the trailing edges of pulses N relative to that of the pretriggers, or the pulse width of N, are considered to represent a measure of selected target range. The powers of pulses WW and UU being equal under this condition, there is no alteration of the memory circuit output and the width of pulses N is held constant. But should the time phase of a selected target echo pip vary relative to that of a corresponding pair of early and late tracking gates, as results from a change in target range, the power contents of the resultant pulses UU and WW are unbalanced in accordance with the direction and amount of variation, to correspondingly alter the electrometer and memory output and hence the time duration of subsequent pulses N, until the phase of the tracking gates controlled by the trailing edges of pulses N is changed to re-establish the power balance between pulses UU and WW. The output of the electrometer and memory circuit is thereby stabilized at this new value, and the new width of pulses N represents the new target range. The basic object of the Tracking Unit is thus to adjust the time phase of the trailing edge of the delay multivibrator square wave output continually, so as to sandwich the reception time phase of each selected target echo signal between the corresponding early and late tracking gates. When this condition prevails, the time phase of the trailing edge of the delay multivibrator outputs N (or what is the same, of the leading edge of the resultant pulses R)

relative to the corresponding pretrigger pulses is a correct indication of selected target range.

Additionally, the feedback loop from the memory output to the electrometer input effects a continuous and automatic change in the electrometer and memory circuit output in accordance with the preestablished rate of change thereof resulting from the feeder diode input, hence enabling the tracking circuit to anticipate changes in target range and to continue tracking during a momentary loss of sight of the target.

Since the Tracking Unit thus continually and automatically adjusts itself to track that echo signal initially sandwiched between the two tracking gates, there is here provided a system for identifying the selected target and following it in range to the exclusion of all others.

Considering the electrometer and memory circuit of this Range Tracking Unit in detail (FIG. 2), reference is first had to the input therefor as embodied in the two feeder diodes 400 and 405. As above described, time coincidence of a received radar echo signal pulse obtained through input 105 with a portion of either the early tracking gate or the late tracking gate of a particular system cycle, provides an output pulse UU in the plate circuit of the early gated amplifier if coincidence of the received signal is had with the early gate, and an output pulse WW in the plate circuit of late gated amplifier if coincidence of the received signal is had with the late gate pulse Z. In the case of early gate coincidence, the pulse UU is coupled to the cathode of the early gate feeder diode 405; while in the case of a late gate coincidence pulse WW is coupled to the cathode of the late gate feeder diode 400. Both of these feeder diodes are back biased in equal amounts against conduction therethrough, and this back bias is bootstrapped to the electrometer and memory circuit output, in the case of diode 405 through channels 406 and 407, and in the case of diode 400 through channel 404. In the instance of an output pulse UU from the early gated amplifier 95, it is differentiated into the wave form XX, the negative going portion XX′ thereof having a relatively short time constant as it overcomes the back bias of the feeder diode 405 to provide conduction therethrough and through the low resistance plate circuit thereof, the positive going portion thereof having a relatively long time constant as it is applied to the higher resistance of channels 406 and 407. In the instance of an output pulse WW from the late gated amplifier 100, it is similarly differentiated into the waveform YY, the negative going portion thereof having a relatively short time constant as it overcomes the back bias of feeder diode 400 to provide conduction therethrough and in the low resistance plate circuit thereof the positive going portion YY′ thereof having a relatively long time constant as it is applied through the relatively high resistance 401 into the plate circuit of the feeder diode 405. It can thus be seen that the occurrence of an early gated amplifier output UU drives the side 409a of capacitor 409 in a negative direction, as results from the negative going portion of the wave form XX, while the occurrence of a late gated amplifier output WW drives the side 409a of capacitor 409 in a positive direction, as results from the positive going portion of wave form YY, the positive going portion of early tracking gate signal XX being absorbed along channels 406 and 407 and the negative going portion of late tracking gate signal YY passing through a feeder diode 400 and being absorbed on a large capacitor. Thus, the two gated amplifier outputs UU and WW function in opposition to each other in their effect upon the side 409a of capacitor 409, driving its potential in a negative direction when early tracking gate signals UU predominate, to indicate that the Tracking Unit range measurement is in excess of the actual selected target range, while predominance of late tracking gate signals WW results in driving side 409a of capacitor 409 in a positive direction, indicating that the Tracking Unit range measurement is short of actual selected target range. If the received signal pulse is properly centered or sandwiched in time between the early and late tracking gates, there is either no signal output from gated amplifiers 95 and 100, or signal outputs obtained therefrom are equal, so that the potential level of side 409a of capacitor 409 is held constant in so far as feeder diode inputs thereto are concerned. The potential level of side 409a of capacitor 409, as established by the differential input thereto through the feeder diodes, provides a D.C. input for the electrometer tube 415.

The term "electrometer" is used herein as being synonymous with a galvanometer or potential measuring device. Moreover, the term "electrometer pentode" refers to an electrometer connected pentode. Likewise, the term "cathode follower triode" is to be understood as being synonymous with a cathode follower connected triode.

The electrometer and memory circuit per se comprises in part the electrometer pentode 415 and a cathode follower memory triode 425. Before considering the operation of this circuit, it should be noted that the cathode of follower 425 is directly coupled to the plate of the electrometer 415, while the cathode of electrometer 415 is directly coupled to the grid of follower 425. Since the grid potential of cathode follower 25 is substantially fixed as a result of the follower action, the cathode to plate potential of the electrometer is similarly fixed and equal thereto. Since resistor 417 in the cathode circuit of follower 425 is chosen to be of a much lesser value than resistor 419, the voltage drop thereacross is substantially fixed and the level thereof follows the action of follower 425. Since electrometer 415 and its cathode resistor 416 are connected across resistor 417, the voltage drop thereacross is likewise substantially fixed, and therefore the cathode current of electrometer 415 may be substantially fixed at a desired value by choosing the proper value of resistor 416. It is to be further noted that the control grid of electrometer 415 is effectively removed therefrom by being tied directly to its cathode. Also, it is to be noted that if the plate to grid potential of follower 425 is maintained substantially constant, the same will be true of the cathode to screen grid potential of electrometer 415, since the cathode of this tube is coupled directly to the grid of follower 425 while the screen grid of the electrometer is coupled to the plate of the follower 425 through the resistor 418. In this manner the screen current of electrometer 415 is fixed at a desired value by choosing the proper value for resistor 418. For this purpose it has been assumed that the plate to grid potential of follower 425 is substantially constant, and the truth of this statement will be shown subsequently in a later portion of the discussion of this electrometer and memory circuit.

The normal operation of a suppressor grid in a pentode as electrometer 415 is to divide the cathode current between the plate and screen grid circuits thereof, but since as previously pointed out the cathode current is fixed, since the cathode to plate potential difference of electrometer 415 is likewise fixed, and since the screen grid current is also fixed, variations in suppressor grid potential operate to accordingly vary the cathode potential level of electrometer 415 in accordance therewith. Also, since the cathode of this electrometer is directly coupled to the grid of follower 425 and since the cathode of follower 425 is directly coupled to the plate of electrometer 415, the plate potential level of the electrometer is correspondingly altered in substantially the exact amount as is accomplished on the cathode, so that although the potential levels of the electrometer plate and cathode are altered, the potential drop therebetween is held substantially constant.

Having thus established the conditions under which the electrometer and memory circuit operates, the following discussion relates to its operation in response to signals obtained through the feeder diode circuitry. If for example, at any time during the operation of the instant tracking unit a pulse UU is obtained of greater power than the corresponding pulse WW, this condition signifies that the time phase of the trailing edge of output pulse N of delay multivibrator 60 must be brought in closer to its leading edge to provide an accurate measure of actual target range. With this condition obtaining, the feeder diode and gated amplifier circuitry shifts the charge on side 409a of capacitor 409 in a negative direction, and hence the suppressor grid of electrometer 415 tied thereto is similarly shifted providing an extremely high input impedance for the electrometer and memory circuit. In view of the previous discussion, this shift in suppressor grid potential level correspondingly alters the plate potential level of the electrometer tube 415. As is shown in the drawings, the plate of electrometer 415, which is tied to the cathode of follower 425, is coupled directly to the grid of a first triode of the delay multivibrator 60 by lead 55a; hence, the resultant negative shift of grid potential of this triode accordingly shifts the time phase of the trailing edge of output pulse N in closer to the leading edge thereof, and this continues until the time phases of tracking gate pulses Y and Z are adjusted to properly sandwich the selected target echo signal therebetween, thus providing a corrected measure of target range.

In addition to the above-discussed correction of delay multivibrator output pulse width, the present electrometer and memory circuit provides, through the charge trapped on side 409a of capacitor 409, a memory of selected target range and a measure and memory of the rate at which selected target range is varying, and on the basis of the previously observed rate of change of selected target range automatically anticipates alterations in the time phase of the trailing edges of pulses N relative to their leading edges required to maintain a correct target range measurement. These effects are accomplished by the inherent feature of the instant electrometer and memory circuit in providing an extremely high input impedance to the electrometer through the suppressor grid of pentode 415, enabling side 409a of capacitor 409 to retain the absolute charge impressed thereon through the feeder diodes 400 and 405 for a substantial time interval, and by the coupling of follower cathode and electrometer plate to the junction point 412 of the two series capacitors 409, 410 through the resistor 411. The potential level of the suppressor grid of the electrometer 415 controls the potential level of the cathode of the follower 425 and the plate of electrometer 415. The absolute charge on side 409a of capacitor 409 first controls the potential level of the voltage drop across the electrometer pentode and hence provides the measure and memory of target range. The potential level of the electrometer plate and follower cathode relative to ground in turn controls the rate of current flow through the resistor 411 between the follower supply and the capacitor 410 through the junction 412. Therefore, when no sginals UU and WW are obtained, or the signals UU are equal in power to the signals WW, assuming that the missile had been approaching closer to the target, the potential level of the potential drop established on capacitor 409 by the charge on side 409a thereof and the level of the suppressor grid of electrometer 415 are continuously driven in a negative direction as electron current is conducted to the series capacitors 410, 409 from the cathode supply of the follower and accumulated on capacitor 410, to close the trailing edges of the delay multivibrator output pulses N toward their leading edges. When the current flow between the cathode supply of the follower and the series capacitors is adjusted to the proper rate by the building up of the proper absolute charge on side 409a of capacitor 409, and with an appropriate R-C value chosen for this circuit in contemplation of the expected condition in use of the system, the automatic action of the electrometer circuit without further input to the capacitor 409 from the feeder diodes causes a rate of change of grid voltage of triode of the multivibrator 60 which provides that rate of change of the position of the trailing edges of the delay multivibrator output pulses N, with relation to their leading edges, which corresponds substantially to the rate at which the tracking circuit has found the target range to be changing. As stated above, the absolute charge established on side 409a of the capacitor 409 from the feeder diode circuitry controls the rate at which the grid potential of the first triode of the multivibrator 60 is changed by action of the rate memory here discussed. Thus, if the rate of change of target range is increased from a particular established rate during automatic tracking operation of the instant device, the output of the appropriate gated amplifier obtains a higher power level than that of the other to accordingly alter the charge on side 409a of capacitor 409 through the feeder diode circuitry. This change in charge accordingly alters the potential levels of the cathode and plate of the electrometer 415 and cathode of the follower 425, causing an instantaneous change in the grid bias of multivibrator triode. The potential difference between electrometer plate or follower cathode and ground is accordingly altered to change the rate of current flow through resistor 411, thus altering the rate memory or rate of change of suppressor grid potential of electrometer 415 and of the grid bias on multivibrator triode. In the loop thus established, the absolute charge placed on side 409a of capacitor 409 through the feeder diode circuitry thus controls not only the grid potential of delay multivibrator triode, but also the rate at which it is automatically changed as the missile closes in on the target.

The electrometer and memory circuit therefore accomplishes two functions, the first being to position the time relationship of the trailing edges of the delay multivibrator output pulses N to their leading edges when a range tracking inaccuracy occurs, and the second being to establish the proper rate of change of the grid potential of delay multivibrator triode to anticipate changes in selected target range as indicated by the previous tracking rate. Once a uniform range tracking rate is obtained, it is thus seen that range tracking can continue automatically for a period of time despite a temporary failure of selected target echo signal reception. The continual reception of echo signals provides a check on the range tracking rate already established, to alter the same should it be found in error, as may result from changes in actual range tracking rate or tracking errors from inherent limitations of the circuitry itself.

In the preceding discussion relating to the conditions established on the electrometer and memory circuit, it was stated that the screen grid to cathode potential difference of the electrometer pentode 415 is fixed on the assumption that the plate to grid potential of the cathode follower 425 is substantially fixed. To show that the plate to grid potential of the cathode follower 425 is fixed, it is to be noted that the cathode follower plate is coupled to a positive supply through channel 426, while the cathode of this follower is coupled to a negative supply through resistors 417 and 419. In the absence of any variable, it is apparent that the plate to cathode potential of the follower is thus fixed, and since it is a cathode follower, the plate to grid potential thereof must likewise be fixed. But as previously pointed out, the absolute cathode potential level does vary as an inherent result of the operation of the electrometer and memory circuit. However, it will be recalled that variations in the cathode potential level of the follower 425 result in corresponding variations of the grid potential of the delay multivibrator triode, and consequent variations in the power of the delay multivibrator output pulses N. The output pulses N obtained from the delay multivibrator 60 are coupled through an integrating network comprising resistor 427, 428, and capacitor 429 to the plate of the cathode follower 425. As the cathode of the follower is moved in a more negative direction, so the output pulses N of the delay multivibrator are correspondingly reduced in power, and vice versa. Consequently, due to the action of the integrating network upon the pulses N obtained from the delay multivibrator, as the cathode of the follower 425 moves in a negative direction the potential level of the plate thereof, as established by the combination of the positive supply and integral of pulses N, likewise moves in a negative direction by a substantially similar amount, and the inverse is obviously true as the follower's cathode potential level is caused to move in a positive direction by action of the electrometer and memory circuit. Since the plate to cathode potential difference and plate to grid potential difference of the follower 425 are maintained substantially fixed, the screen grid to cathode potential difference of the electrometer pentode 415 is accordingly maintained at a substantially fixed value, as stated early in this description in establishing the conditions imposed upon the elements of the electrometer circuit for obtaining the results desired from it.

The foregoing discussion of the tracking unit is based on the assumption that a particular target has been selected, and it has been shown that once a target is so selected the circuit locks onto this target and selectively tracks it in range, thereby excluding all other received echo signals from its operation. There must therefore be provided some means whereby a target may be initially selected prior to launching of the missile. For this purpose a slew switch 430 (FIG. 2) is provided in the plate circuit of the feeder diode 405, interposed between said plate and capacitor 409. With this switch closed to contact 430b, operation of the circuit as afore-described is accomplished; however, with the switch 430 closed to contact 430a, connection is had between the side 409a of capacitor 409 and an externally controlled variable voltage supply (not shown). Through this supply, various desired voltages may be applied across capacitor 409 and to the suppressor grid of the electrometer tube until, by observation of a monitor oscilloscope, it is determined that the electrometer and memory circuit output voltage is properly time phasing the tracking gates to sandwich therebetween the received radar echo pulses of a desired target. The switch 430 may then be closed to its contact 430b, to effect the above-described automatic range tracking of this selected target under the corrective control of the Tracking Unit. A slew relay 430c, manually controlled at the monitor, may be utilized to accomplish this switching between slew control and automatic tracking.

It can be seen, therefore, that the time phases of the trailing edges of the delay multivibrator outputs N, and accordingly of the leading edges of the cathode follower outputs or range pulses R, are continually adjusted into a fixed time relationship to the reception of selected target echoes by variations in the grid bias of triode in the delay multivibrator 60. This adjustment is accomplished by the output of the memory and electrometer circuit, which is in turn under the control of the plate outputs of the early and late gated amplifiers 95 and 100. Thus, the time phases of the trailing edges of the delay multivibrator outputs N, of the leading edges of the cathode follower outputs or range pulses R, and of the pulses X and W, each continually represent, when compared with the time phases of the corresponding transmitted pulses and the time phases of the corresponding pretrigger pulses, the range of a selected target on which the tracking circuit has been locked by the initial setting of the electrometer and memory circuit output through the slew voltage to properly sandwich in time a desired target echo signal between the early and late tracking gates Y and Z.

In conclusion, the present invention is incorporated in the tracking unit of the control system of a guided missile to provide a memory of the last observed target range and rate at which that range has been changing. This enables the system to anticipate changes in target range. Should the target be momentarily lost to the intelligence system, the target range indication continues to vary at the same rate and continues to provide the correct target range. Thus, the control system remains locked on the selected target at all times and in readiness to resume range tracking when the intelligence system regains observation of the target.

Obviously many modifications and variations of the present invention are possible in the light of the above teachings. It is therefore to be understood that within the scope of the appended claims the invention may be practiced otherwise than as specifically described.

What is claimed is:

1. In a guided missile control system, a voltage responsive circuit comprising a pentode, the suppressor grid thereof providing a high impedance input to the circuit, a cathode follower having its grid and cathode connected respectively to the cathode and plate of the pentode to substantially fix the potential drop thereacross, means for effecting substantially constant cathode current for said pentode, means responsive to the said pentode plate potential causing the plate potential of said follower to vary substantially with its cathode and grid potentials, and a resistor connecting the pentode screen grid and follower plate thus substantially fixing the screen grid current, the pentode control grid being tied to its cathode to remove the former functionally from the circuit, the application of input voltages to said pentode suppressor grid thereby varying the level of the pentode plate and cathode potentials without substantially changing the net pentode plate to cathode potential difference and with substantially no suppressor grid current flow.

2. In a guided missile control system, a voltage responsive circuit comprising a vacuum tube having suppressor and screen grids, the suppressor grid providing a high impedance input to the circuit, means for establishing a substantially fixed voltage difference between the tube plate and cathode while permitting variations in the potential level on said tube plate and cathode, means for establishing a substantially constant tube cathode current, and means for effecting a substantially constant tube screen grid current during operation of the circuit, the application of input voltages to said tube suppressor grid thereby varying the levels of the tube plate and cathode potentials without substantially changing the net tube plate to cathode potential difference and with substantially no suppressor grid current flow and thereby providing a signal to adjust pulse responsive control means.

3. In a guided missile control system, a voltage responsive and memory circuit comprising a pentode, the suppressor grid thereof providing a high impedance input to the circuit, a cathode follower having its grid and cathode connected respectively to the cathode and plate of the pentode to substantially fix the potential drop thereacross, means for effecting substantially constant cathode current for said pentode, means responsive to the pentode plate potential causing the plate potential of said follower to vary with its cathode and grid potentials, the pentode control grid being tied to its cathode to effectively remove the former functionally from the circuit, a resistor connecting the pentode screen grid and follower plate thus substantially fixing the screen grid current, a charge accumulator, a resistor connecting said accumulator with the cathode of said follower, and means for combining the potential level of said accumulator with input voltage signals applied to said suppressor grid, the presence of an input signal thereby varying the levels of the pentode plate and cathode potentials in accordance therewith and said level being further varied at a rate controlled by the rate of current flow between said follower cathode and said accumulator through said last-mentioned resistor, both without susbtantially changing the net pentode plate to cathode potential difference and with substantially no suppressor grid current flow.

4. In a guided missile control system, a voltage responsive and memory circuit comprising a pentode, the suppressor grid thereof providing a high impedance input to the circuit, a cathode follower having its grid and cathode connected respectively to the cathode and plate of the pentode to substantially fix the potential drop thereacross, means for effecting substantially constant cathode current for said pentode, means responsive to the pentode plate potential causing said follower plate potential to vary with its cathode and grid potentials, the pentode control grid being tied to its cathode to effectively remove the former functionally from the circuit, a resistor connecting the pentode screen grid and follower plate thus substantially fixing the screen grid current, a charge accumulator, a resistor connecting said accumulator with the cathode of said follower, and means for applying the potential level of said accumulator to said suppressor grid, the presence of an input signal thereby varying the levels of the pentode plate and cathode potentials in accordance therewith and said levels being further varied at a rate controlled by the rate of current flow between said follower cathode and accumulator through said last-mentioned resistor, both without substantially changing the net pentode plate to cathode potential difference and with substantially no suppressor grid current flow.

References Cited by the Examiner
UNITED STATES PATENTS

| | | | |
|---|---|---|---|
| 2,496,886 | 2/1950 | Molloy | 324—123 X |
| 2,624,847 | 1/1953 | Jesse | 324—123 X |
| 2,652,490 | 9/1953 | Levy | 324—123 X |

ARTHUR GAUSS, *Primary Examiner.*

CHESTER L. JUSTUS, FREDERICK M. STRADER,
*Examiners.*